(12) United States Patent
Brown

(10) Patent No.: US 9,384,487 B2
(45) Date of Patent: Jul. 5, 2016

(54) PHONE NUMBER PAYMENTS FOR BILL PAYMENTS USERS

(75) Inventor: Steven T. Brown, Milwaukee, WI (US)

(73) Assignee: FIS Financial Compliance Solutions, LLC, Jacksonville, FL (US)

( * ) Notice: Subject to any disclaimer, the term of this patent is extended or adjusted under 35 U.S.C. 154(b) by 0 days.

(21) Appl. No.: 13/016,274

(22) Filed: Jan. 28, 2011

(65) Prior Publication Data

US 2012/0197786 A1 Aug. 2, 2012

(51) Int. Cl.
*G06Q 40/00* (2012.01)
*G06Q 20/42* (2012.01)
*G06Q 20/10* (2012.01)
*G06Q 20/32* (2012.01)
*G06Q 20/40* (2012.01)

(52) U.S. Cl.
CPC ........... *G06Q 20/425* (2013.01); *G06Q 20/102* (2013.01); *G06Q 20/32* (2013.01); *G06Q 20/325* (2013.01); *G06Q 20/40* (2013.01)

(58) Field of Classification Search
CPC ........ G06Q 20/00; G06Q 30/00; G06Q 40/00
USPC ........................................................ 705/3–44
See application file for complete search history.

(56) References Cited

U.S. PATENT DOCUMENTS

| | | | |
|---|---|---|---|
| 7,096,003 B2* | 8/2006 | Joao et al. .................... 455/406 |
| 7,254,560 B2* | 8/2007 | Singhal .................. G06Q 20/02 705/64 |
| 7,490,091 B2* | 2/2009 | Lunenfeld |
| 8,010,451 B1* | 8/2011 | Nappi .................... G06Q 20/10 705/35 |
| 8,061,597 B2* | 11/2011 | Hogg et al. .................... 235/380 |
| 8,566,188 B2* | 10/2013 | Smith et al. ..................... 705/34 |
| 2004/0098350 A1* | 5/2004 | Labrou et al. ................... 705/64 |
| 2007/0203833 A1* | 8/2007 | Huang et al. ................... 705/40 |
| 2008/0177661 A1* | 7/2008 | Mehra .............................. 705/44 |
| 2009/0150266 A1* | 6/2009 | Dickelman ............ G06Q 20/02 705/30 |
| 2013/0013510 A1* | 1/2013 | Ansari .................. G06Q 20/28 705/44 |
| 2013/0066788 A1* | 3/2013 | Goodrich ............. G06Q 20/027 705/75 |

\* cited by examiner

*Primary Examiner* — Frantzy Poinvil
(74) *Attorney, Agent, or Firm* — Finnegan, Henderson, Farabow, Garrett & Dunner, LLP

(57) ABSTRACT

Described herein are methods and systems for registering a phone number as a payment facilitator. The phone number can be registered through a user's Bill Pay account, which is associated to the user's financial account. The user can specify the types of purchases that can be made using the phone number and request that a merchant processing a payment using the phone number convey customized details regarding the purchase. Purchase details associated with a purchase can then be provided to the consumer by the merchant. Also described herein are methods and systems for processing a payment using a phone number. The payment can be processed, in part, by a payment processor providing a consumer with a Bill Pay account associated with the consumer's financial account. The payment can be processed without the use of a credit card network and, as a result, without incurring unnecessary Interchange fees.

33 Claims, 10 Drawing Sheets

PHONE NUMBER PAYMENTS FOR BILL PAYMENTS USERS

FIELD OF THE DISCLOSURE

The present disclosure related to payment systems. In particular, the present disclosure related to payment systems for Bill Pay users.

BACKGROUND

U.S. consumers use credit and debit cards to initiate billions of financial transactions with both online and brick-and-mortar merchants. Though largely unnoticed, numerous parties can play one or more roles in the processing, routing, authorizing, and settling stages of each financial transaction. In exchange for their services, these parties can collect fees either directly from the merchant or from other parties involved in the transaction. However, the cost of these fees may be ultimately borne by the merchant selling his goods or services. This cost, in turn, may be recovered through either higher prices for consumers or more sales.

For example, in a typical credit card transaction (or debit card transaction processed through a credit card network), in addition to the customer and the merchant, the parties responsible for routing payment information can include: (1) a merchant bank (the bank where the merchant's financial account is located); (2) an acquiring bank or merchant acquirer (a bank or entity that specializes in managing credit card transactions for merchants); (3) a credit card network (the communications network that connects issuing and acquiring banks, built by card associations such as AMEX®, MASTERCARD®, and VISA®); (4) a payment processing bank or entity (a bank or entity specializing in the routing and authorization of credit card transactions to issuing banks); and (5) the issuing bank (the company that issues the credit card to the consumer).

In a typical transaction, the consumer either swipes his or her credit card at one of the merchant's registers, otherwise known as the Point-of-Sale ("POS"), or, in the case of an online transaction, sends his or her credit card number, name, billing address, and/or other details of the transaction to the merchant through the Internet. Next, the merchant forwards the transaction details and card number to the merchant acquirer. The merchant acquirer then routes the transaction data and the request through the card association network to the payment processor. The payment processor then performs a variety of authorization tasks and security checks, including confirming available funds and/or card number validation on behalf of the issuing bank. Or, alternatively, the payment processor sends the transaction details to the issuing bank that performs some or all of the authorization and security checks on its own. Next, the issuing bank indicates to the payment processor whether or not the transaction is approved and that approval is routed back through the credit card network in order to notify the merchant acquirer. The merchant acquirer then notifies the merchant and, if approved, the merchant completes the sale to the consumer.

In order to collect the funds, the merchant sends a request to the merchant acquirer. The merchant acquirer forwards the request through the credit card network to the payment processor who similarly forwards the request to the issuing bank. Transactions are settled when the issuing bank pays the payment processor, the payment processor pays the merchant acquirer, and the merchant acquirer transfers the funds into the merchant bank account (less the various parties' fees for conducting the transaction). Lastly, the transaction shows up in the customer's credit card statement with a relatively brief and sometimes cryptic description of the transaction, and the customer pays the issuing bank the balance due at a later time. Alternatively, in the case of a debit card transaction processed through a credit card network, the balance is automatically debited from the consumer's financial account held by the issuing bank.

Presently, credit and debit cards are the most favored form of payment for purchases. However, as demonstrated above, the payment process is a relatively cumbersome one, involving numerous parties and providing little to the consumer in the form of a record of the details of the transaction. Additionally, the majority of the fees that are ultimately paid by the merchant result from the fees owed to the credit card companies in exchange for the use of their networks ("Interchange fees"). Interchange fees vary depending on the credit card company, but may cost the merchant approximately 2-3% on every sale.

As a result, it may be desirable to provide more simple payment processing systems and methods that reduce the transaction fees paid by merchants. Specifically, it may be desirable to facilitate merchant-to-consumer transactions without routing the transaction through one of the credit card company's networks, thereby avoiding Interchange fees.

Furthermore, it may be desirable to provide systems and methods that give consumers more control over their financial transactions. Specifically, it may be desirable to provide consumers with the ability to control when and/or where a particular payment method may be used and/or dictate the type of information and transaction details that are provided to their issuing bank by merchants and, optionally, the type of transaction details seen on the consumer's bank statements.

SUMMARY OF THE DISCLOSURE

In accordance with certain embodiments of the present disclosure, methods and systems for processing a financial transaction over a network are disclosed. According to one aspect, a method includes registering a phone number associated with a user and a financial account in order to process merchant payments through an online Bill Payment platform. In one aspect, a user can customize the usage of the phone number as a payment facilitator. In another aspect, a user can dictate the level of purchase information detail provided by a merchant to the financial institution maintaining the user's financial account. In this manner, a user can customize the level of detail and particular information that accompanies transaction information in the user's account statements. In a further aspect, a method and system for processing a financial transaction over a network is disclosed that does not involve a credit card company or a credit card company's network and, therefore, avoids Interchange fees.

Additional objects and advantages of the invention will be set forth in part in the description which follows, and may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several

DESCRIPTION OF EXEMPLARY EMBODIMENTS

Reference will now be made in detail to certain exemplary embodiments, examples of which are illustrated in the accompanying drawings. Wherever possible, the same reference numbers will be used throughout the drawings to refer to the same or like items.

Disclosed herein are various exemplary methods and exemplary systems for processing a financial transaction over a network. Generally, the exemplary methods include prompting a consumer to register an identification number, associating the identification number with a financial account of the consumer, and authorizing use of the identification number as a payment facilitator with one or more merchants. In another aspect, following authorization of the identification number as a payment facilitator, the consumer can customize the usage of the payment facilitator by, for example, dictating the types of merchant by which the payment facilitator can be used, the location of merchants with which the payment facilitator can be used, or a time of day at which the payment facilitator can be used. In a further aspect, a user can dictate the level of purchase information detail provided by a merchant to the consumer's financial institution maintaining the consumer's financial account. In some embodiments, the identification number is the customer's phone number.

Figure 1:
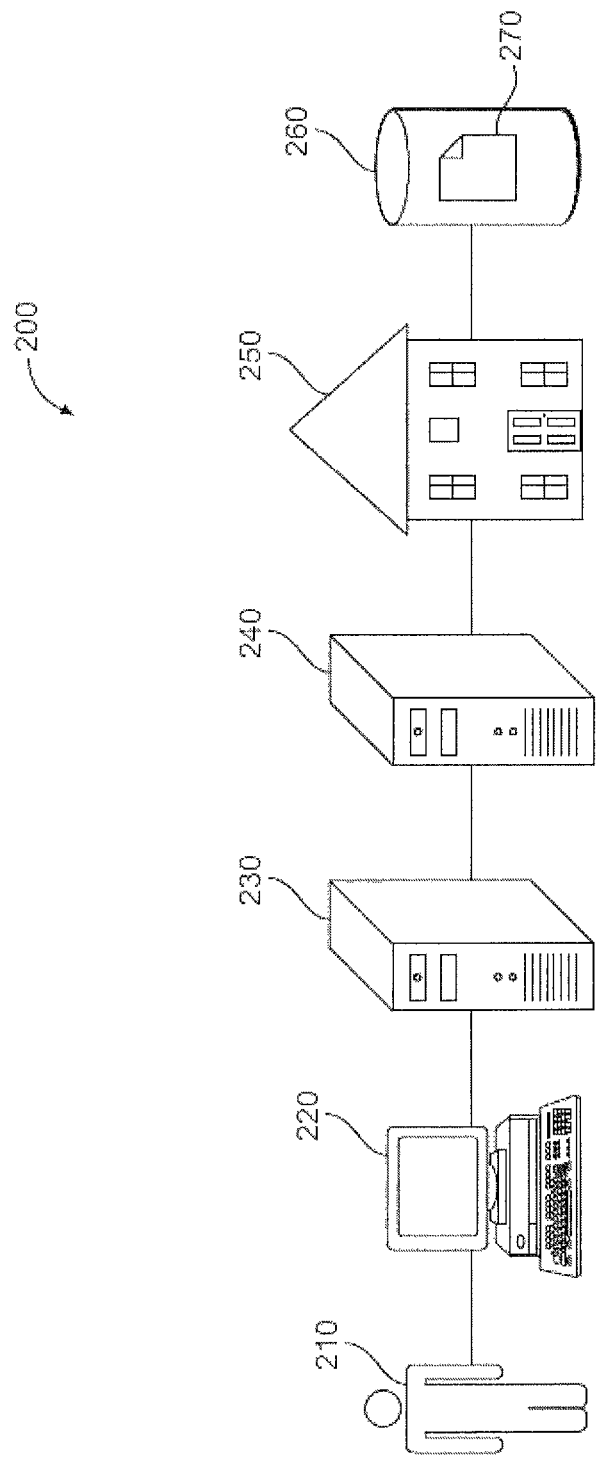
FIG. 1 is an illustration of an exemplary embodiment of a network or system as described herein.

FIG. 1 depicts an exemplary embodiment of a system 200 according to the present disclosure. System 200 can be configured to process financial transactions between consumers and merchants. In one aspect, system 200 can comprise a merchant's point-of-sale terminal 220. Point-of-sale terminal 220 can be a computer or other device comprising a processor, a memory, a monitor, and user input devices such as a mouse and/or a keyboard.

In another aspect, point-of-sale terminal 220 can be in communication with routing partner server 230. In one embodiment, routing partner server 230 can comprise a processor and a memory configured to perform front-end processing of a financial transaction between consumer 210 and the merchant. In another exemplary embodiment, a plurality of point-of-sale terminals 220 can be in communication with routing partner server 230. In a further aspect, communication between the one or more point-of-sale terminals 220 and routing partner server 230 can be accomplished in a variety of ways. For example, point-of-sale terminals 220 can be connected to routing partner server 230 via a cable or other wired connection. In other embodiments, point-of-sale terminal 220 can be connected to routing partner server 230 wirelessly.

Point-of-sale terminals 220, as well as routing partner server 230, described above, are only a couple examples of components that can comprise system 200. Further, it is contemplated that additional and/or different configurations of system 200 may be employed without departing from the scope of the present disclosure. The particular embodiments of system 200 that are depicted in the figures are not intended to be exhaustive and system 200 is not limited to these particular configurations.

In another aspect of the system shown in FIG. 1, routing partner server 230 can be configured to communicate with payment processor server 240 through a network connection, e.g., the Internet. Again, the particular configuration and examples shown and discussed herein is not intended to limit the various embodiments of system 200. The communication channel or network connecting routing partner server 230 and payment processor server 240 can be any communication link between the routing partner server and the payment processor server over which information can be transmitted.

Payment processor server 240 can comprise a processor and memory configured to access consumer 210's financial account information. In one embodiment, consumer 210's sensitive financial account information is stored in a record 270 of a database 260. Database 260 can be maintained by an issuing bank 250. In one aspect, payment processor server 240 can access record 270, or some portion thereof, in database 260 through a network or communication channel with issuing bank 250. Again, the network comprising payment processor 240, issuing bank 250, and database 270 can comprise additional, fewer, or alternate components capable of serving a similar purpose to those components described herein. The particular configurations described above are not intended to be exhaustive or to limit the scope of system 200 and any network configuration known in the art can be implemented.

Figure 2:
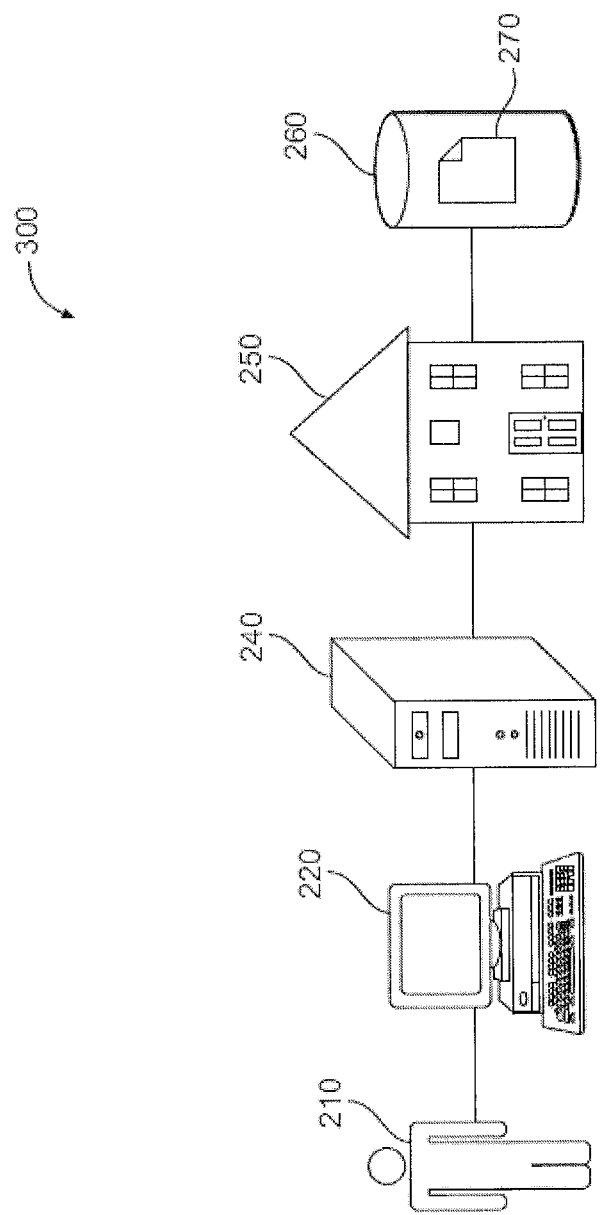
FIG. 2 is an illustration of an exemplary embodiment of a network or system as described herein.

FIG. 2 depicts another exemplary embodiment of a system 300 configured to process a financial transaction between a consumer and a merchant. System 300 shown in FIG. 2 differs from that shown in FIG. 1 in that point-of-sale terminals 220 can be connected directly to payment processor 240 via a network connection, e.g., the Internet. In this manner, information collected at point-of-sale terminals 220 need not pass through a routing partner before being sent to payment processor 240.

Figure 3:
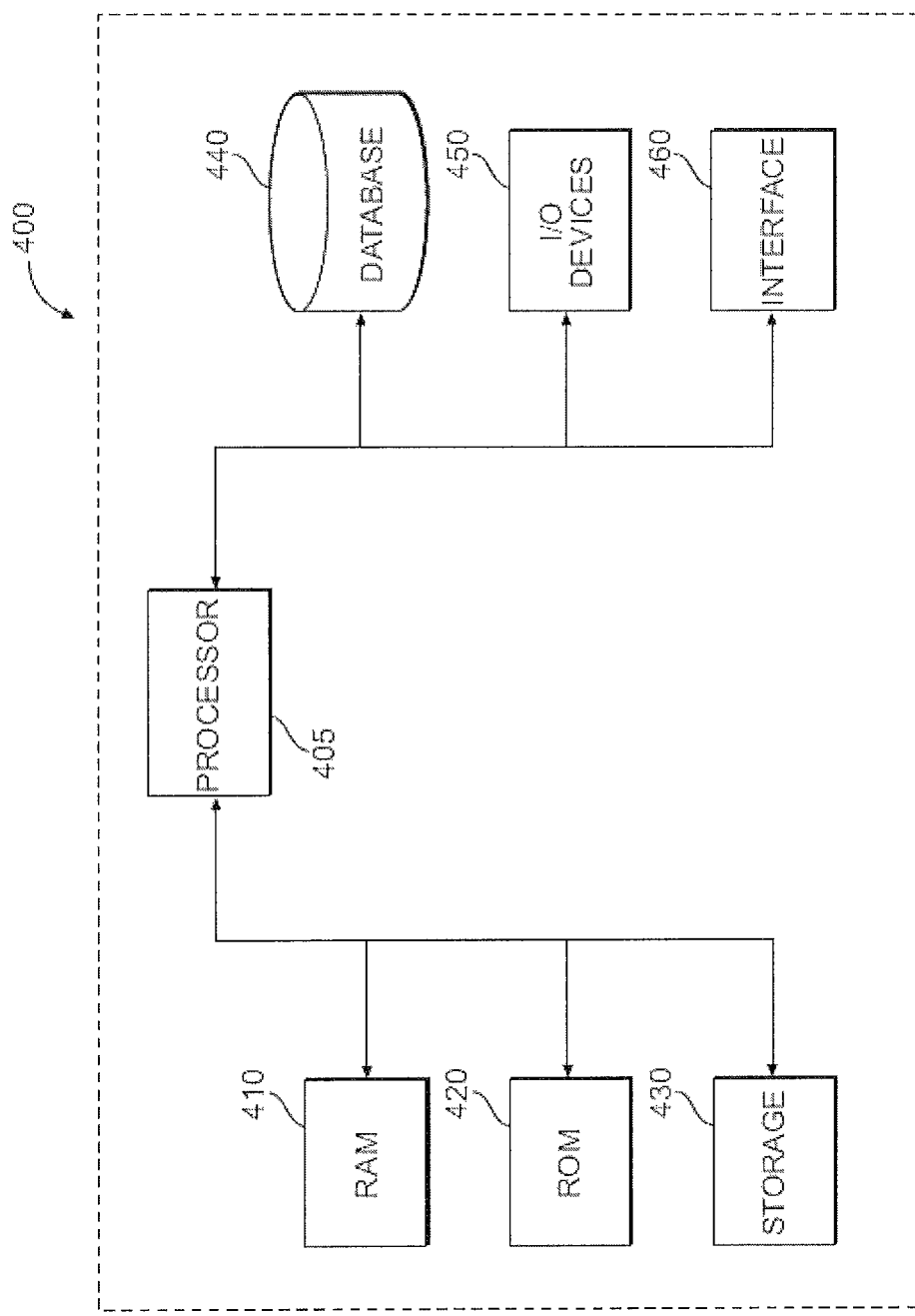
FIG. 3 is an illustration of an exemplary embodiment of a computer as described herein.

In another aspect, point-of-sale terminals 220, as well as routing partner server 230, payment processor 240, issuing bank 250, and database 260, may include any type of processor-based system on which processes and methods consistent with the disclosed embodiments may be implemented. For example, as illustrated in FIG. 3, a system 400 may include one or more hardware and/or software components configured to execute software programs, such as software for storing, processing, and analyzing data. For example, system 400 may include one or more hardware components such as, for example, processor 405, a random access memory (RAM) module 410, a read-only memory (ROM) module 420, a storage system 430, a database 440, one or more input/output (I/O) devices 450, and an interface 460. Alternatively and/or additionally, system 400 may include one or more software components such as, for example, a computer-readable medium including computer-executable instructions for performing methods consistent with disclosed embodiments. It is contemplated that one or more of the hardware components listed above may be implemented using software. For example, storage 430 may include a software partition associated with one or more other hardware components of system 400. System 400 may include additional, fewer, and/or different components than those listed above. It is understood that the components listed above are exemplary only and not intended to be limiting.

Processor 405 may include one or more processors, which may be configured to execute instructions and process data to perform one or more functions associated with system 400. As illustrated in FIG. 3, processor 405 may be communicatively coupled to RAM 410, ROM 420, storage 430, database 440, I/O devices 450, and interface 460. Processor 405 may be configured to execute sequences of computer program instructions to perform various processes, which will be described in more detail below. The computer program instructions may be loaded into RAM 410 for execution by processor 405.

RAM 410 and ROM 420 may each include one or more devices for storing information associated with an operation of system 400 and/or processor 405. For example, ROM 420 may include a memory device configured to access and store information associated with system 400, including information for identifying, initializing, and/or monitoring the operation of one or more components and subsystems of system 400. RAM 410 may include a memory device for storing data associated with one or more operations of processor 405. For example, ROM 420 may load instructions into RAM 410 for execution by processor 405.

Storage 430 may include any type of mass storage device configured to store information that processor 405 may use to perform processes consistent with the disclosed embodiments. For example, storage 430 may include one or more magnetic and/or optical disk devices, such as hard drives, CD-ROMs, DVD-ROMs, or any other type of mass media device.

Database 440 may include one or more software and/or hardware components that cooperate to store, organize, sort, filter, and/or arrange data used by system 400 and/or processor 405. For example, database 440 may include account information and/or payment historical data. Alternatively, database 440 may store additional and/or different information.

I/O devices 450 may include one or more components configured to communicate information with a user associated with system 400. For example, I/O devices 450 may include a console with an integrated keyboard and mouse to allow a user to input parameters associated with system 400. I/O devices 450 may also include a display including a graphical user interface (GUI) for outputting information on a monitor. I/O devices 450 may also include peripheral devices such as, for example, a printer for printing information associated with system 400, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 460 may include one or more components configured to transmit and receive data via a communication network, such as the Internet, a local area network, a workstation peer-to-peer network, a direct link network, a wireless network, and/or any other suitable communication platform. For example, interface 460 may include one or more modulators, demodulators, multiplexers, demultiplexers, network communication devices, wireless devices, antennas, modems, and any other type of device configured to enable data communication via a communication network.

Figure 4:
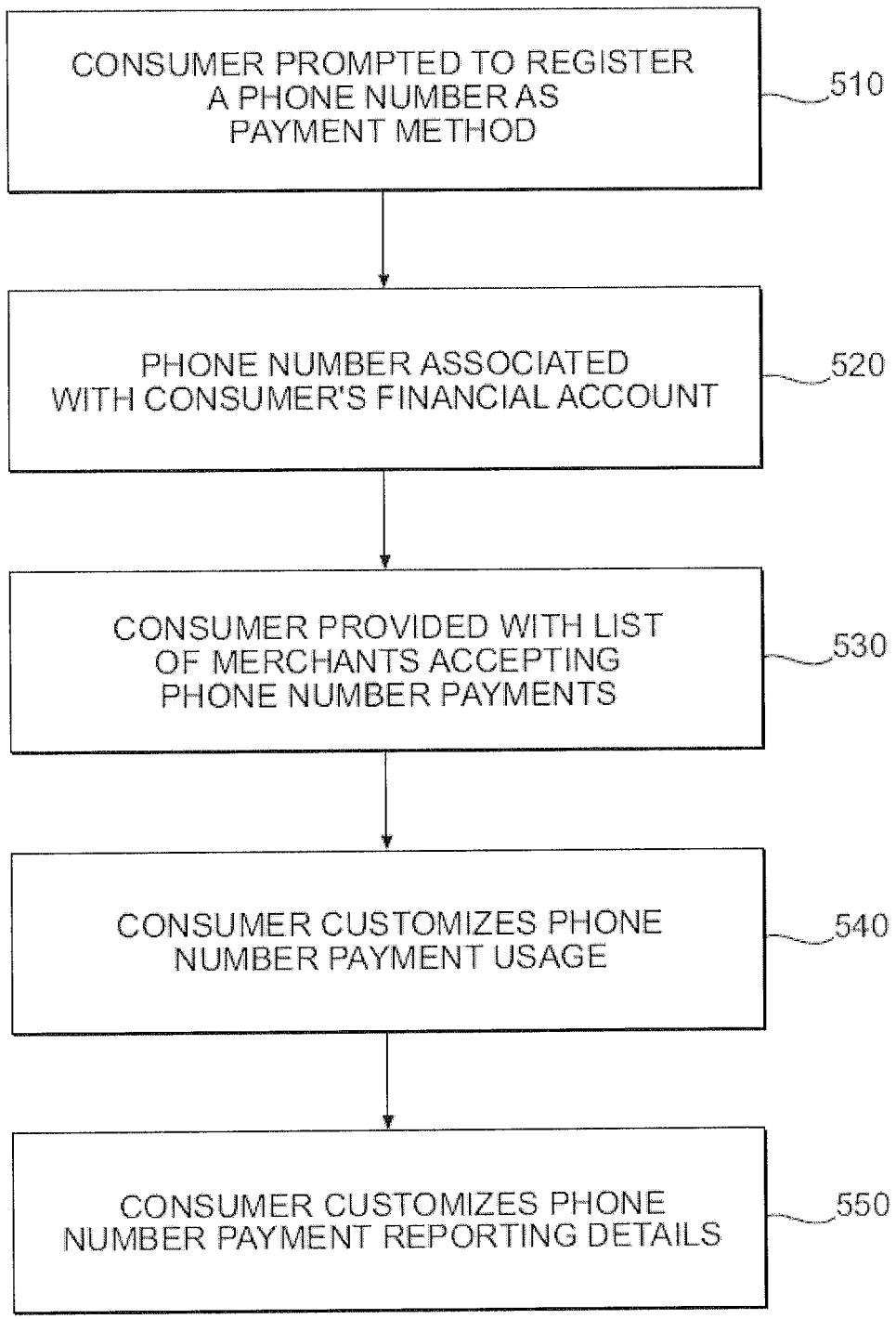
FIG. 4 is a flow chart depicting one exemplary sequence for registering a user identification number for use as a payment facilitator.

FIG. 4 depicts an exemplary method for registering an identification number for use as a payment facilitator according to this disclosure. In some embodiments, the identification number is a consumer's phone number. In other embodiments, the identification number is some other alphanumeric identifier. In the exemplary embodiment shown in FIG. 4, in step 510 a consumer can be prompted to register his or her phone number as a payment facilitator. In some embodiments, this prompt can be generated at the consumer's homepage of a Bill Pay platform provided by a payment processor. The Bill Pay platform can be linked to the consumer's financial account. In other embodiments, a user can be prompted to register his or her phone number from the homepage of the financial institution that maintains the consumer's financial account or from some other webpage. In further embodiments, the consumer can be prompted to register his or her phone number through correspondence mailed to the consumer's residence, work address, or P.O. Box. Additionally, the consumer can be prompted to register his or her phone number by a routing partner or some other party.

After the consumer provides his or her phone number or other alphanumeric identification number, the phone number can be associated with the user's financial account at step 520. In some embodiments, where a payment processor has prompted the user to register his or her phone number through a Bill Pay platform, the payment processor can associate the consumer's phone number with a previously-registered financial account that the consumer has provided in order to pay various bills, such as utility bills, etc. In other embodiments, where the financial institution that maintains the consumer's financial account has prompted the consumer to register his or her phone number as a payment facilitator, the financial institution can associate the phone number with the consumer's financial account. In further embodiments, a routing partner can associate the consumer's phone number with the consumer's financial account where the routing partner prompted the consumer to register their phone number as a payment facilitator. In such a case where a party that is not already privy to the consumer's financial account information prompts the consumer to register his or her phone number as a payment facilitator, the user may also be prompted to register his or her financial account to facilitate its association with the phone number.

At step 530, after the phone number is associated with the consumer's financial account, the user can be provided with a list of merchants willing and/or able to accept the phone number as a payment facilitator. In some embodiments, the list of participating merchants can be provided by the same entity that prompted the consumer to register his or her phone number and associated the phone number with the consumer's financial account. In other embodiments, however, the list of participating merchants can be provided by another party.

At step 540, the consumer can then be permitted an opportunity to customize the usage of his or her phone number as a payment facilitator. For example, in some embodiments, the consumer can select which of the merchants from the list of participating merchants the consumer wishes to authorize use of the phone number as a payment facilitator. In such a manner, the consumer can exclude particular participating merchants from using the phone number as a payment facilitator. In other embodiments, the consumer can customize the usage of his or her phone number as a payment facilitator in other ways. For example, the consumer can choose to only allow particular types of goods or services to be purchased using the phone number. Or, alternatively, the consumer can selectively exclude particular types of goods or services from being purchased with the phone number. In further embodiments, the consumer can dictate a dollar limit that phone number payments may not exceed. In other embodiments, the consumer can prohibit one or more merchants from processing phone number payments at particular times of day, days of the week, or months of the year, etc. In some embodiments, the consumer can prohibit merchants located in particular locales from using the phone number as a payment facilitator.

The consumer can further customize his or her phone number payment options at step 550. Specifically, in some embodiments, the consumer can select the level of purchase detail he or she wishes a merchant to pass along to his or her payment processor or financial institution. For example, the consumer can configure his or her phone number payment options such that merchants using the phone number as a payment facilitator are prompted for a relatively large amount of details regarding the purchase. In some embodiments, the consumer can request that merchants using the phone number as a payment facilitator forward the purchase amount, the purchase date, the purchase time, the merchant's name, the merchant location, and/or a list of items purchased, etc. In other embodiments, the consumer can request additional or less information. In such a manner, the consumer is provided the ability to customize the amount of information received regarding his or her purchases, rather than relying on the relatively limited information currently provided by credit card companies. In further embodiments, the consumer can request a first level of purchase details for one or more merchants and a different level of purchase details for one or more other merchants. For example, a consumer can request relatively little purchase detail from merchant gas stations and grocery stores while requesting a great deal of purchase detail from online merchants.

Figure 5:
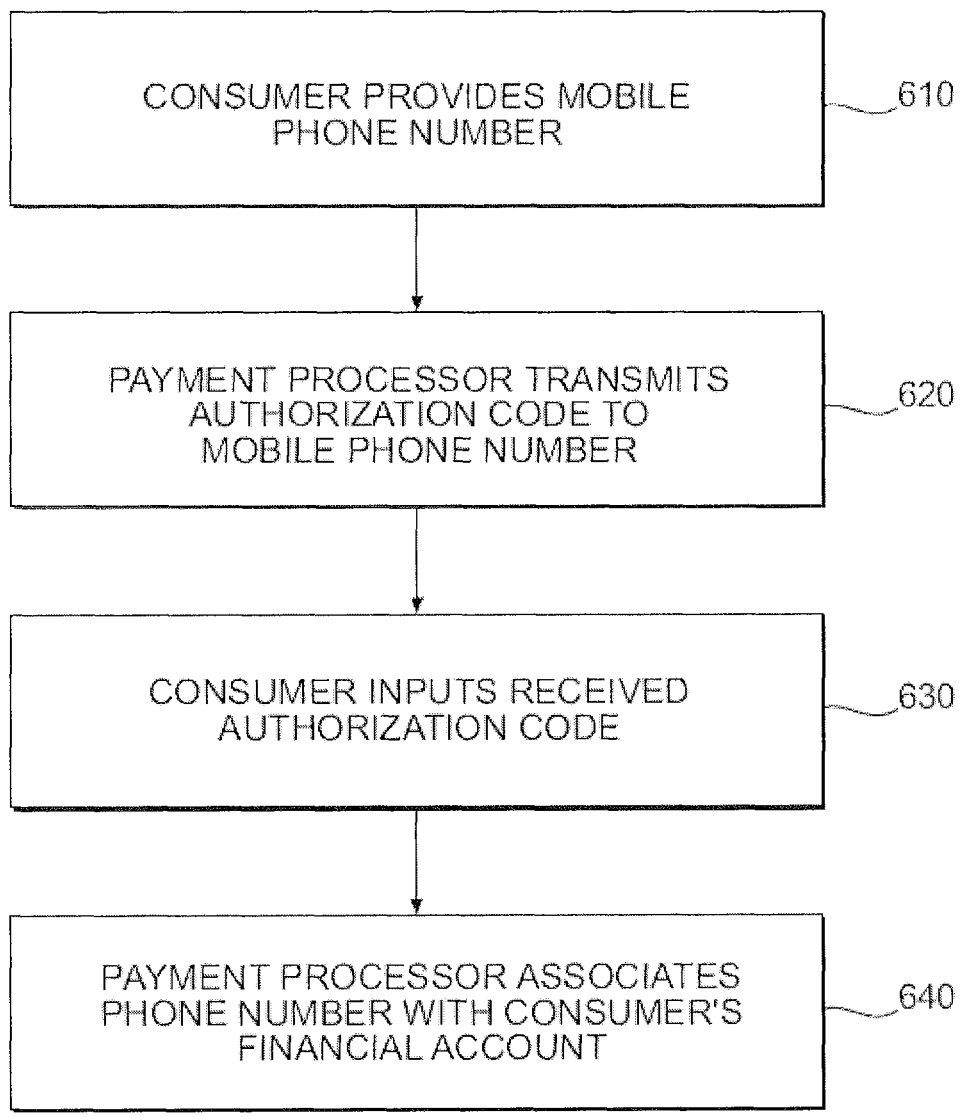
FIG. 5 is a flow chart depicting one exemplary sequence for registering a user identification number for use as a payment facilitator.

Referring now to FIG. 5, a method of securely registering a phone number is described. At step 610, for example, a consumer can register his or her mobile phone number in response to a prompt to register a phone number as a payment facilitator. In one embodiment, at step 620, upon receiving the mobile phone number, the payment processor (or other party soliciting the phone number registration) can transmit an authorization code to the mobile phone. In one aspect, the authorization code can be transmitted as a text message or an e-mail message. In other embodiments, the authorization code can be incorporated into a voice message or some other media. At step 630, the consumer can then be prompted to provide the authorization code sent to his or her mobile phone. Next, at step 640, the payment processor (or other party soliciting the phone number registration) can compare the authorization code sent to the consumer's mobile phone to the authorization code received from the consumer. In some embodiments, if the two authorization codes match, then the payment processor (or other party soliciting the phone number registration) can associate the mobile phone number with the consumer's financial account. In other embodiments, alternative or additional steps can be incorporated to securely associate a phone number with a financial account.

Figure 6:
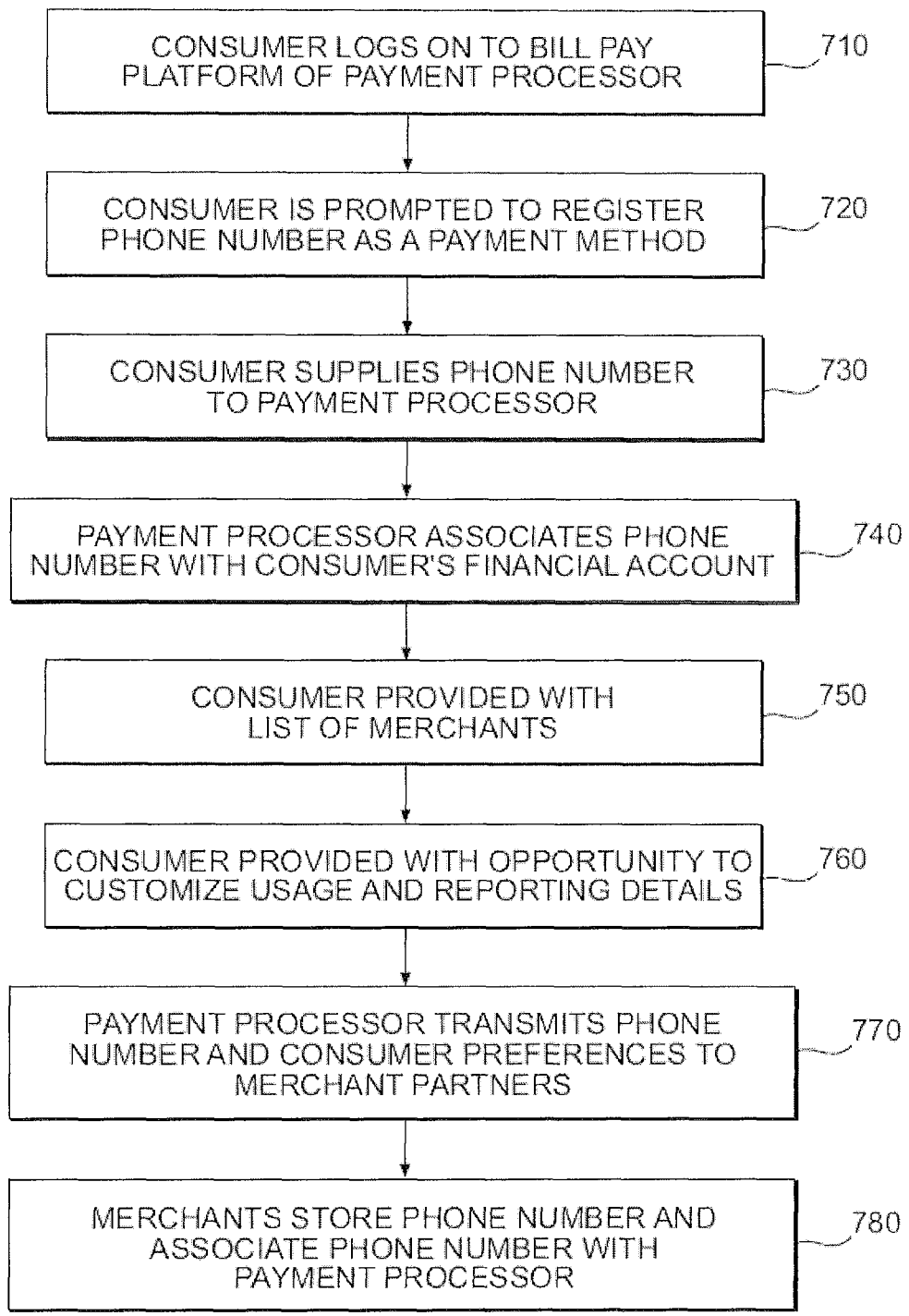
FIG. 6 is a flow chart depicting one exemplary sequence for registering a user identification number for use as a payment facilitator.

FIG. 6 depicts another exemplary embodiment of the registration process. According to this embodiment, at step 710, a consumer can log on to his or her Bill Payment platform, hosted by a payment processor. Assuming the consumer has previously set up his or her Bill Pay account, the payment processor may already have the consumer's financial account information associated with the consumer's login information, e.g., username and password. If the consumer has not previously set up a Bill Pay account, the consumer may need to register his or her financial account information with the payment processor (or other provider of the Bill Pay platform).

At step 720, the consumer is prompted to register his or her phone number for use as a payment facilitator. In response, at step 730, the consumer provides the phone number that he or she wishes to register. Next, at step 740, the payment processor can associate the phone number received from the consumer with the consumer's financial account, which is already linked to the consumer's Bill Pay account. As discussed above, the process of prompting the consumer for his or her phone number, receiving the consumer's phone number, and associating the phone number with a financial account can be performed in a variety of ways and incorporate numerous steps configured to provide additional security for the various registration steps. The above examples of potential security steps that can be implemented are exemplary only and should not be considered limiting in nature.

Upon associating the phone number with the consumer's financial account, at step 750, the payment processor can provide the consumer with the aforementioned list of merchants accepting phone number payments. As discussed previously, this list can be used by the consumer to customize the payment options associated with the registered phone number at step 760. Specifically, the consumer can configure his or her phone number payment account to customize the types of transactions that can be processed using the phone number, the types of merchants that may use the phone number as a payment facilitator, the time, days, or months that the phone number can be used as a payment facilitator, and/or the level of purchase details a merchant using the phone number payment facilitator must provide to the payment processor (or other party hosting the Bill Pay platform). Again, it is noted that these examples of customizable features are exemplary in nature and not intended to be an exhaustive list of options made available to a consumer.

Next, at step 770, the payment processor (or other party configuring the phone number payment facilitator) can transmit the phone number to all merchants registered to utilize phone number payments. In some embodiments, the consumer's preferences regarding his or her customization of the phone number payment options and/or purchase detail requests can be forwarded to each merchant partner registered to utilize phone number payments.

At step 780, the merchants receiving the registered phone number can store the phone number and any consumer preferences or requests associated therewith. In some embodiments, the merchants also associate the registered phone number with the payment processor providing the consumer's Bill Pay platform. In this manner, when a consumer later enters his or her phone number as a payment facilitator at any one of these merchants, the merchant can compare the received phone number to a list of registered phone numbers and, if a match is found, associate that phone number with a particular payment processor. In some embodiments, after identifying the payment processor associated with the phone number, the merchant can initiate processing of a payment with that payment processor and forward any payment details requested by the consumer that are associated with the phone number.

Figure 7:
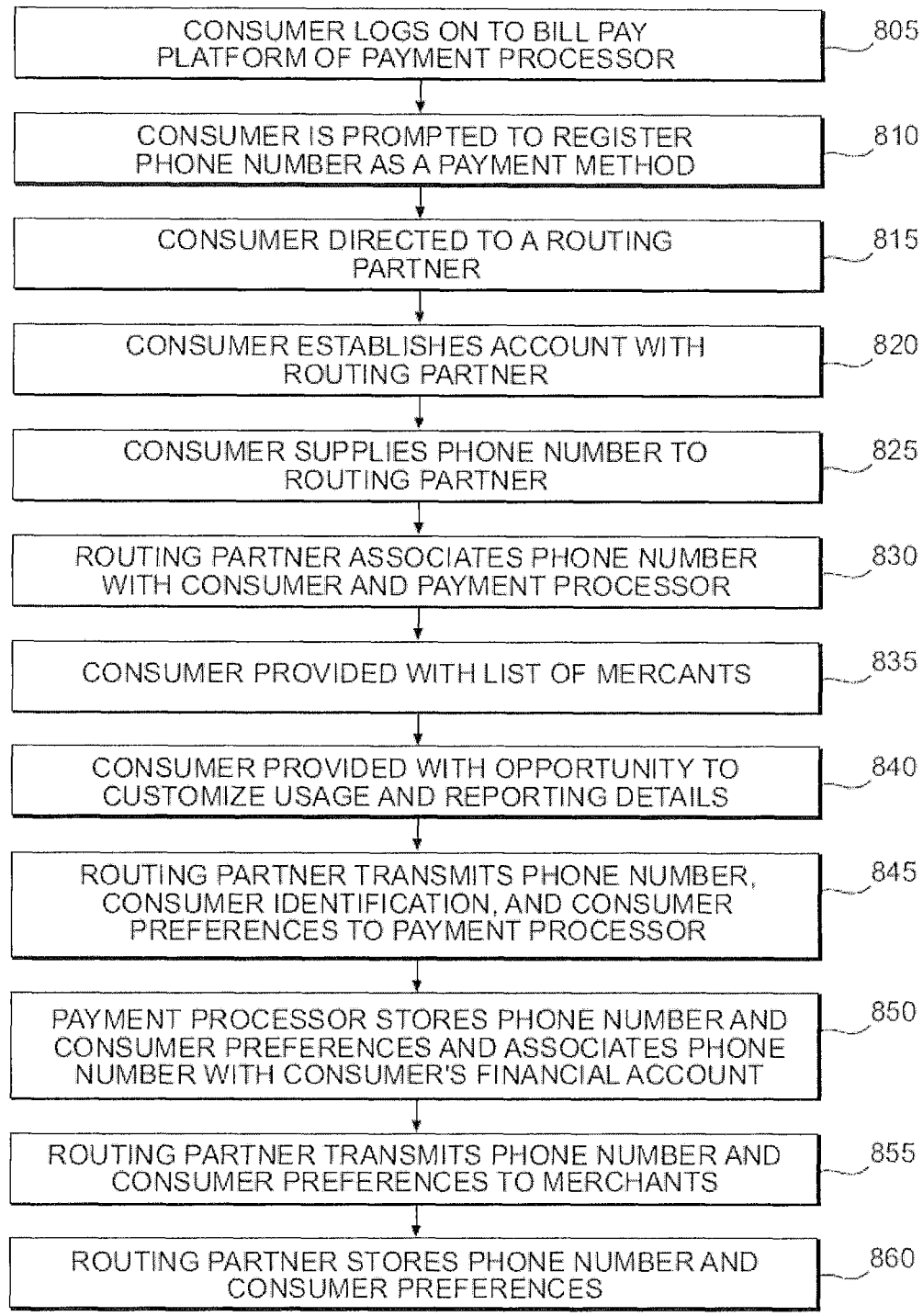
FIG. 7 is a flow chart depicting one exemplary sequence for registering a user identification number for use as a payment facilitator

FIG. 7 depicts another exemplary embodiment of a phone number payment registration method. The method depicted in FIG. 8 comprises the cooperation of a routing partner.

At step 805, a consumer can log on to his or her Bill Payment platform, hosted by a payment processor. Assuming the consumer has previously set up his or her Bill Pay account, the payment processor may already have the consumer's financial account information associated with the consumer's login information, e.g., username and password. If the consumer has not previously set up a Bill Pay account, the consumer may need to register his or her financial account information with the payment processor (or other provider of the Bill Pay platform).

At step 810, the consumer can be prompted to register his or her phone number for use as a payment facilitator. In some embodiments, if the consumer elects to register a phone number as a payment facilitator, the consumer can be directed to a routing partner, e.g., a routing partner's website, at step 815 in order to continue the registration process. In another embodiment, the consumer can continue the registration process with the payment processor or some other party.

If the consumer is directed to a routing partner, at step 820, the consumer can be prompted to create an account with the routing partner. In some embodiments, creating an account with the routing partner comprises the consumer providing registration information. For example, the consumer may need to provide a username, password, and answers to security questions as part of the registration process. In other embodiments, the registration information can comprise less, more, or alternative information. Additional security measures can also be taken at this stage. For example, a consumer may have to verify an e-mail address and/or a mailing address in order to complete registration. In other embodiments, a consumer may have to verify alternative information. In another aspect, the routing partner can associate the consumer's registration information and newly created account with the payment processor from which the consumer was directed. In some embodiments, the routing partner can obtain information for identifying the consumer and/or the consumer's financial account from the payment processor.

Once an account with the routing partner is established, at step 825, the consumer can be prompted to provide the phone number he or she wishes to register as a payment facilitator. In one embodiment, providing the phone number to be registered is incorporated into the registration process discussed above with respect to step 820. In other embodiments, the consumer can provide the phone number to be registered at a time later than the registration process at step 820.

At step 830, the routing partner can associate the phone number received from the consumer with the consumer's newly created account, the payment processor from which the consumer was directed, and/or the consumer's Bill Pay platform provided by the payment processor.

As discussed above, the process of prompting the consumer for his or her phone number, receiving the consumer's phone number, and associating the phone number with a payment processor, financial account, and/or Bill Pay account can be performed in a variety of ways and incorporate numerous steps configured to provide additional security for the various registration steps. The above examples of potential security steps that can be implemented are exemplary only and should not be considered limiting in nature.

Upon associating the phone number with the consumer's newly created account, financial account, payment processor, and/or Bill Pay account, at step 835, the routing partner can provide the consumer with a list of merchants accepting phone number payments processed by the routing partner. As discussed previously, this list can be used by the consumer to customize the payment options associated with the registered phone number at step 840. Specifically, the consumer can configure his or her phone number payment account to customize the types of transactions that can be processed using the phone number, the types of merchants that may use the phone number as a payment facilitator, the time, days, or months that the phone number can be used as a payment facilitator, and/or the level of purchase details a merchant using the phone number payment facilitator must provide to the payment processor (or other party hosting the Bill Pay platform). Again, it is noted that these examples of customizable features are only exemplary in nature and not intended to be an exhaustive list of options made available to a consumer. In some embodiments, the consumer can also configure his or her phone number payment account to the customize a level of payment details to be provided by merchants processing payments using the phone number. The various ways in which such payment details can be customized is discussed above.

At step 845, the routing partner can transmit the registered phone number and consumer identification information to the payment processor. In some embodiments, the routing partner can also transmit the consumer's customized account preferences to the payment processor. In other embodiments, less, more, or alternative information can be transmitted from the routing partner to the payment processor.

Next, at step 850, the payment processor can store the registered phone number in a database, e.g., database 260, and associate the registered phone number with the consumer's Bill Pay account and/or financial account. In some embodiments, the payment processor can also store any of the consumer's customized account preferences received from the routing partner. This information can also be associated with the consumer's Bill Pay account and/or financial account. In other embodiments, the payment processor can store less, more, or alternative information received from the routing partner.

At step 855, the routing partner can transmit the registered phone number to all merchants registered to utilize phone number payments. In some embodiments, the consumer's preferences regarding his or her customization of the phone number payment options and purchase detail requests can be forwarded to each merchant partner registered to utilize the phone number as a payment facilitator.

At step 860, the merchants receiving the registered phone number can store the phone number and any consumer preferences or requests associated therewith. In this manner, when a consumer later provides his or her phone number as a payment facilitator at any one of these merchants, the merchant can compare the received phone number to a list of registered phone numbers and, if a match is found, associate that phone number with the routing partner. In some embodiments, after identifying the routing partner associated with the phone number, the merchant can initiate processing of a payment with that routing partner and forward any payment details requested by the consumer that are associated with the phone number. The routing partner can provide any necessary front-end processing of the transaction and then forward the transaction to the payment processor for any necessary back-end processing. In other embodiments, online merchants permitting payment with a registered phone number can provide a link to the routing partner's website at checkout. In this manner, if a consumer wishes to pay using a phone number, the consumer can click on the link and be directed to the routing partner's website, where the consumer can log on to his or her account and provide his or her registered phone number. The phone number purchase process is described in further detail below.

Figure 8:
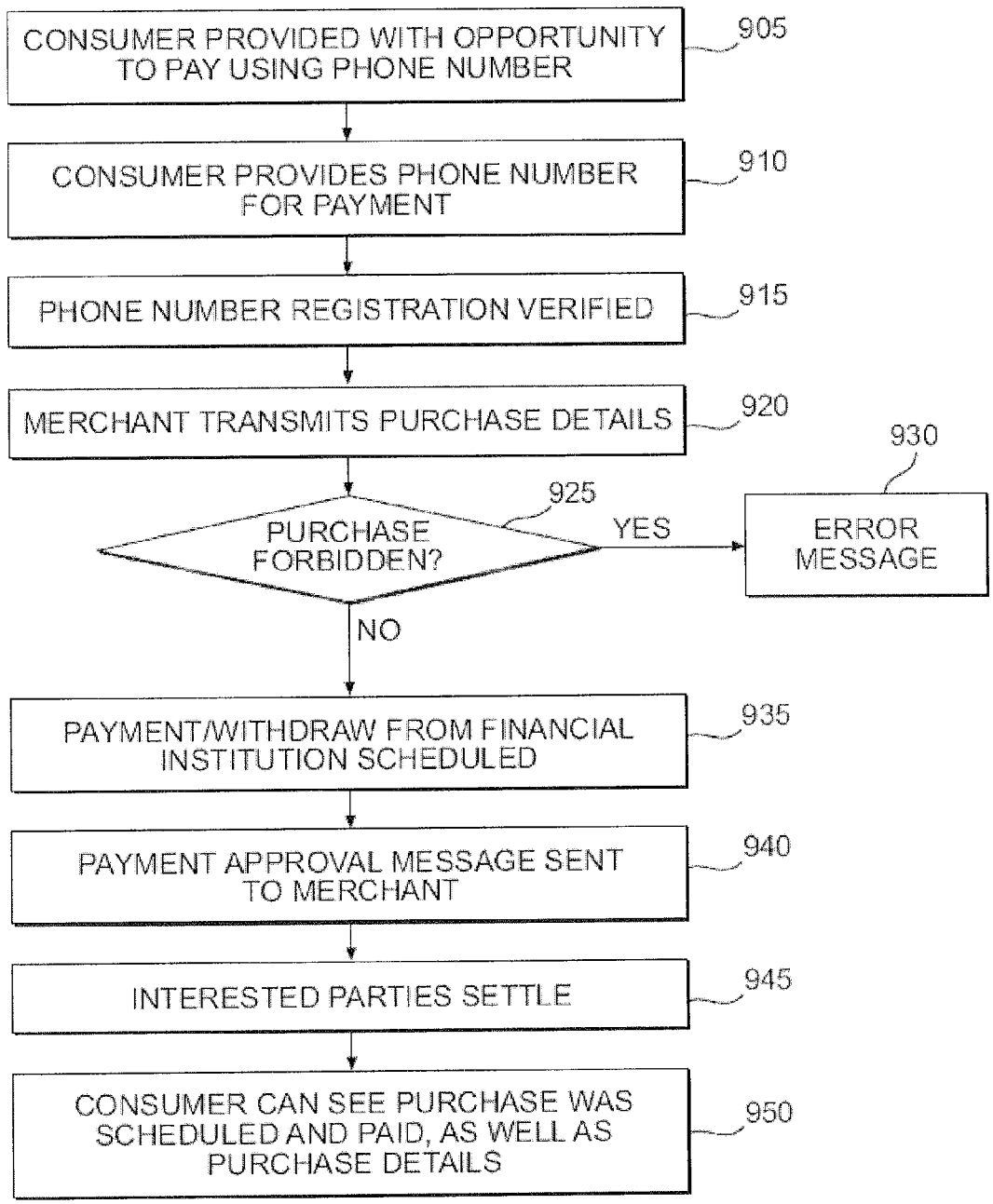
FIG. 8 is a flow chart depicting one exemplary sequence for processing a payment using a user identification number.

FIG. 8 depicts a method for completing a purchase using a previously-registered phone number. First, at step 905, the consumer is presented with an opportunity to pay for his or her purchase using a registered phone number.

The consumer can provide his or her phone number at step 910. In some embodiments, the consumer can provide the phone number directly to the merchant. In other embodiments, upon expressing a desire to pay using a phone number, the consumer can be directed to a payment processor or routing party for processing the payment.

The phone number provided is verified at step 915. In some embodiments, the verification process comprises confirming that the phone number is a registered phone number and that any other identification information provided by the consumer at the time of checkout matches the identification information associated with the phone number. In other embodiments, the verification process can involve alternative steps or security measures.

Once the phone number provided by the consumer has been verified, at step 920, the merchant can provide purchase details to either a routing party or a payment processor associated with the phone number. In some embodiments, the purchase details provided by the merchant comprise the purchase amount, the merchant's name, and any information that the consumer has requested be forwarded as part of the purchase process. In other embodiments, less, more, or alternative purchase information can be provided by the merchant.

At step 925, the party in receipt of the purchase details can verify the purchase is not forbidden by any of the consumer's customized payment options. For example, if, during the account customization process, the consumer indicated he or she did not want the registered phone number to be used by an online merchant based outside the United States, any request for purchase processing originating from such a merchant would be forbidden. In other embodiments, rather than forwarding the purchase details to another party for verification that the purchase conforms to the consumer's customized payment options, the merchant can perform the verification itself, assuming it is in possession of the consumer's customized payment options.

If the purchase is forbidden, at step 930, an error message is generated and sent to the consumer. In some embodiments, the reason that the purchase is forbidden is also forwarded to the consumer. In further embodiments, the consumer can be provided with an opportunity to log in to their phone number payment account and change any customized payment options.

If the purchase is not forbidden, at step 935, payment to the merchant and a withdrawal from the consumer's financial account is scheduled. Next, at step 940, a payment approval message from a payment processor or the financial institution maintaining the consumer's financial account is sent to the merchant.

At step 945, the various parties involved in the process, e.g., the merchant, the financial institution maintaining the consumer's financial account, and any intermediaries, settle with one another.

At step 950, the consumer can log on to his or her phone number payment account and/or Bill Pay account and view all purchases attempted using the phone number, any scheduled payments, and/or completed purchase details. In some embodiments, the completed purchase details comprise the payment information requested by the consumer during the customization of his or her payment options. For example, the purchase details can comprise the merchant's name and address, the total purchase prices, a list of purchased goods or services, and the date and time of the purchase. In other embodiments, the purchase details can comprise less, more, or additional information.

Figure 9:
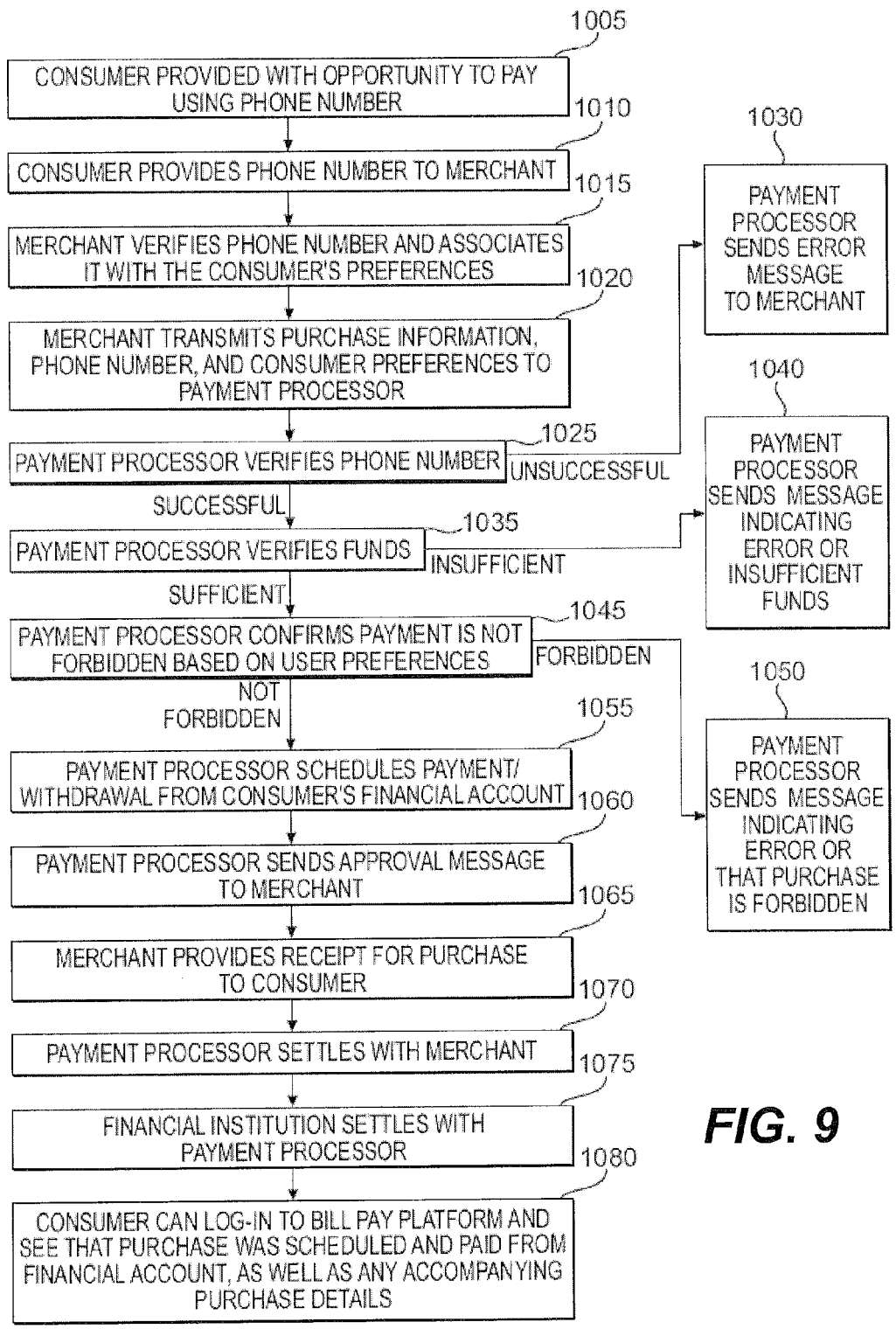
FIG. 9 is a flow chart depicting one exemplary sequence for processing a payment using a user identification number.

FIG. 9 depicts another exemplary embodiment of the payment process using a previously-registered phone number. At step 1005, the consumer is presented with an opportunity to pay for his or her purchase using a registered phone number.

The consumer can provide his or her phone number to the merchant at step 1010 and then, at step 1015, the merchant can verify the phone number, as discussed above, and associate the phone number with the consumer's customized purchase options.

Next, at step 1020, the merchant can transmit purchase information, consumer identification information, the phone number, and/or the consumer's customized payment options to a payment processor maintaining the consumer's Bill Pay account.

At step 1025, the payment processor can again verify the phone number by confirming that the phone number and any consumer identification information match a record containing a registered phone number for a consumer possessing a Bill Pay account with the payment processor. If this verification process is unsuccessful, at step 1030, the payment processor can send an error message to the merchant and deny processing of the payment. In some embodiments, the error message sent by the payment processor is presented to the consumer along with an invitation to register a phone number for use as a payment facilitator.

If the verification process is successful, at step 1035, the payment processor verifies, through a communication channel with a financial institution maintaining the consumer's financial account, that the consumer's financial account contains sufficient funds to process the payment. If it is determined that the consumer's financial account contains insufficient funds, at step 1040, the payment processor can generate and send an error message to the merchant indicating the there are insufficient funds to process the payment. In other embodiments, the error message sent by the payment processor is also presented to the consumer.

If it is determined that sufficient funds are contained in the consumer's financial account to process the payment, then, at step 1045, the payment processor can compare the purchase details received from the merchant with any customized payment options associated with the consumer's phone number payment account. If it is determined, based on the purchase details provided by the merchant, that the purchase is forbidden by the consumer's customized payment options, at step 1050, the payment processor can generate and send an error message to the merchant indicating that the purchase is forbidden by the consumer's customized payment options. In some embodiments, the error message sent by the payment processor can also be presented to the consumer. In other embodiments, the error message can be presented to the consumer and comprise an invitation and/or instructions for changing the customized payment options currently associated with the consumer's phone number payment account.

If it is determined, based on the purchase details provided by the merchant, that the purchase is not forbidden, then, at step 1055, the payment processor can schedule the payment to the merchant and a withdrawal from the consumer's financial account. Next, at step 1060, the payment processor transmits a payment approval message to the merchant and, at step 1065, the merchant provides the consumer with a receipt for his or her purchase.

Next, at step 1070, the payment processor settles with the merchant by transmitting the purchase price to the merchant or the merchant's financial account and, at step 1075, the financial institution maintaining the consumer's financial account settles with the payment processor by reimbursing the payment processor for the purchase price out of the consumer's financial account and paying the payment processor any fees associated with its handling of the transaction. Because no information was transmitted using a credit card network, Interchange fees associated with use of a credit card may be avoided. In alternative embodiments, the payment processor is transmitted the purchase price plus any processing fees from the consumer's financial account prior to settling with the merchant. Then, after the payment processor is in receipt of the necessary funds, the payment processor settles with the merchant by transmitting the purchase price to the merchant or the merchant's financial account.

At step 1080, the consumer can log on to his or her phone number payment account and/or Bill Pay account provided by the payment processor and view all purchases attempted using the phone number, any scheduled payments, and/or completed purchase details. In some embodiments, the completed purchase details comprise the payment information requested by the consumer during the customization of his or her payment options. For example, the purchase details can comprise the merchant's name and address, the total purchase prices, a list of purchased goods or services, and the date and time of the purchase. In other embodiments, the purchase details can comprise less, more, or additional information.

Figure 10:
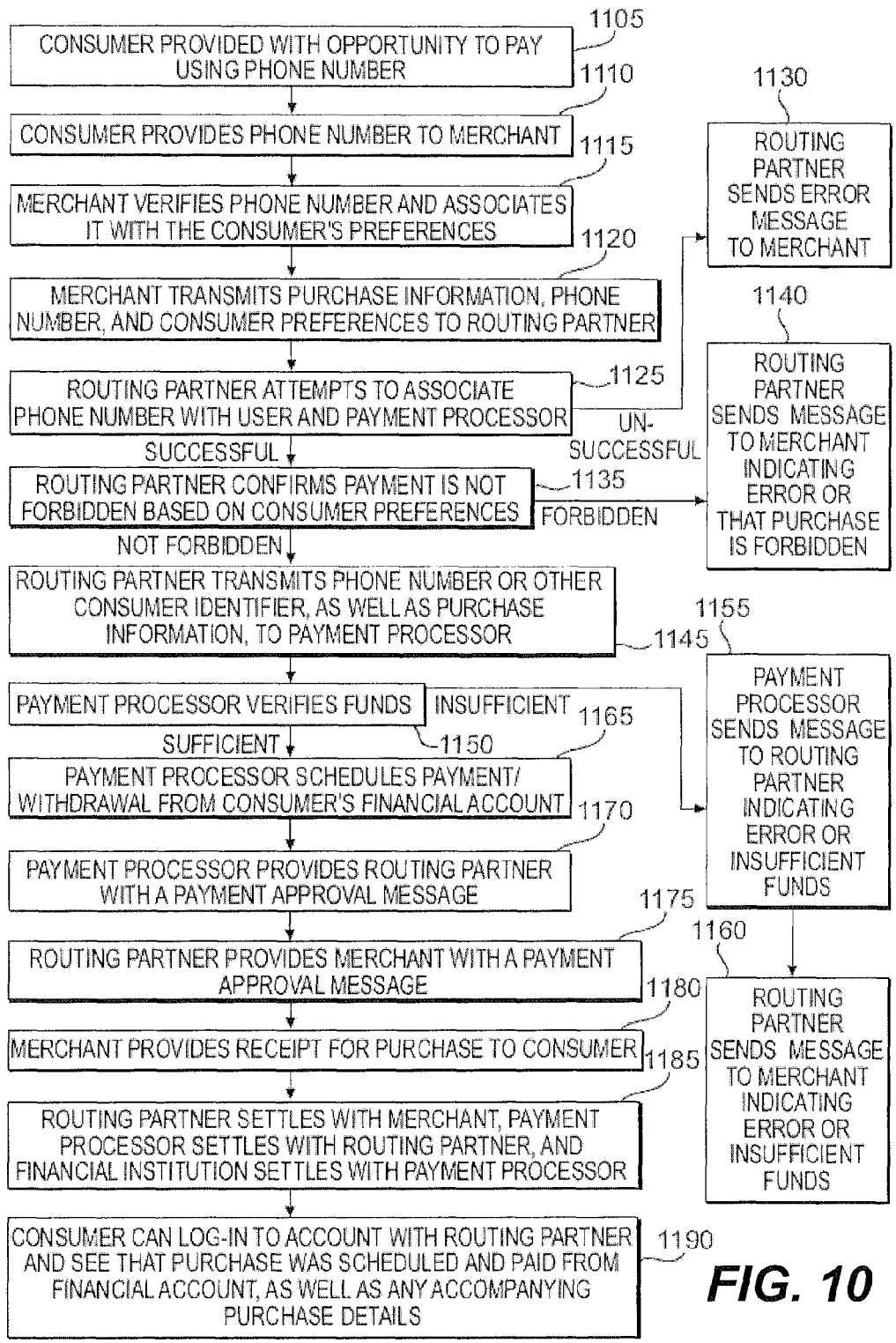
FIG. 10 is a flow chart depicting one exemplary sequence for processing a payment using a user identification number.

FIG. 10 depicts another exemplary embodiment of a payment process using a previously-registered phone number. The method depicted in FIG. 10 comprises the cooperation of a routing partner.

First, at step 1105, the consumer is presented with an opportunity to pay using a registered phone number. Next, at step 1110, the consumer can provide his or her phone number to the merchant and, at step 1115, the merchant can verify the phone number, as discussed above, and associate the phone number with the consumer's customized purchase options. Alternatively, upon receiving an indication from the consumer that he or she desires to use a phone number for payment, the merchant can direct the consumer to a routing partner, e.g., a routing partner's website. There, the consumer can provide log in information and the phone number and the routing party can verify the phone number.

Next, at step 1120, the merchant can transmit purchase information, consumer identification information, the phone number, and/or the consumer's customized payment options to the routing partner associated with the consumer's phone number payment account. In other embodiments, the merchant can transmit less, more, or additional information to the routing partner.

The routing partner can then attempt to associate the verified phone number with a consumer and a payment processor at step 1125. If the routing partner is unable to associate the phone number with any consumer and/or payment processor, then, at step 1130, the routing partner can generate and send an error message to the merchant. In some embodiments, the error message sent by the routing partner is also presented to the consumer along with an invitation to register a phone number for use as a payment facilitator.

If the routing partner can successfully associate the phone number with a user and payment processor, at step 1135, the routing partner can compare the purchase details received from the merchant with any customized payment options associated with the consumer's phone number payment account. If it is determined, based on the purchase details provided by the merchant, that the purchase is forbidden by the consumer's customized payment options, at step 1140, the routing partner can generate and send an error message to the merchant indicating that the purchase is forbidden by the consumer's customized payment options. In some embodiments, the error message sent by the routing partner can also be presented to the consumer. In other embodiments, the error message can be presented to the consumer and comprise an invitation and/or instructions for changing the customized payment options currently associated with the consumer's phone number payment account.

If the routing partner determines, based on the purchase details provided by the merchant, that the purchase is not forbidden, then, at step 1145, the routing party can transmit the purchase information and details, as well as the phone number or some other consumer identifier to a payment processor. In other embodiments, the routing party can transmit less, more, or alternative information to the payment processor.

Upon receipt of payment information and either the phone number or some other consumer identifier, at step 1150, the payment processor verifies, through a communication channel with a financial institution maintaining the consumer's financial account, that the consumer's financial account contains sufficient funds to process the payment. If it is determined that the consumer's financial account contains insufficient funds, at step 1155, the payment processor can generate and send an error message to the routing partner merchant indicating that there are insufficient funds to process the payment. Next, at step 1160, the routing partner either forwards the error message from the payment processor or generates and/or sends another error message to the merchant indicating that there are insufficient funds to process the payment. In some embodiments, the payment processor can send the error message to both the routing partner and the merchant. In other embodiments, an error message generated by the payment processor, the routing partner, and/or the merchant is presented to the consumer, explaining the lack of sufficient funds to process the purchase.

If it is determined that sufficient funds are contained in the consumer's financial account to process the payment, then, at step 1165, the payment processor can schedule a payment and a withdrawal from the consumer's financial account.

Next, at step 1170, the payment processor transmits an approval message to the routing partner, indicating that the purchase is approved and a payment has been scheduled. Then, in response, the routing partner can generate and send an approval message to the merchant at step 1175, again confirming the purchase has been approved and a payment has been scheduled. And subsequent to receipt of an approval message, at step 1180, the merchant can provide the consumer with a receipt for his or her purchase.

Next, at step 1185, the routing party can settle with the merchant by transmitting the purchase price to the merchant or the merchant's financial account, the payment processor can settle with the routing partner by transmitting an amount due to the routing party, minus any processing fees charged by the payment processor, and the financial institution maintaining the consumer's financial account settles with the payment processor by reimbursing the payment processor for the amount owed, plus any potential fees associated with the payment processor's handling of the transaction. Because no information was transmitted using a credit card network, Interchange fees associated with use of a credit card may be avoided. It is also important to note that the precise sequence of the various settlements described in step 1185 is not critical. For example, the routing party can settle with the merchant prior to the payment processor settling with the routing partner or vice versa.

Following settlement, at step 1190, the consumer can log on to his or her phone number payment account and/or Bill Pay account provided by the payment processor and view all purchases attempted using the phone number, any scheduled payments, and/or completed purchase details. In some embodiments, the completed purchase details comprise the payment information requested by the consumer during the customization of his or her payment options. For example, the purchase details can comprise the merchant's name and address, the total purchase prices, a list of purchased goods or services, and the date and time of the purchase. In other embodiments, the purchase details can comprise less, more, or additional information.

It should further be appreciated that additional features can also be incorporated into the methods and systems described above to improve their functionality. For example, the merchant, routing partner, payment processor, and/or financial institution maintaining the consumer's financial account can, at the time a purchase is either approved, scheduled, or settled, provide a message indicating such to the consumer at the registered phone number. In some embodiments, the message can be a text or voice message describing the nature and details of the purchase. In other embodiments, the message can be sent in the form of a different medium or can comprise less, more, or alternative information regarding the purchase.

The methods described in this disclosure should not be limited to the examples provided. Rather, the examples are only representative of the different methods disclosed herein.

Furthermore, while the above disclosure describes the use of a phone number as a payment facilitator, it should be understood that any alphanumeric character string, of any length, can be used in conjunction with the methods and systems described herein. The disclosure is not limited only to phone numbers or strings comprising numerical values.

Additionally, other embodiments will be apparent from consideration of the specification and practice of the present disclosure. It is intended that the specification and examples be considered as exemplary only, with a true scope and spirit of the invention being indicated by the following claims.

What is claimed is:

1. A computer-implemented method for registering an identification number as a payment facilitator, the method, performed by one or more processors, comprising:
    providing, over a first network, a user with access to a bill payment platform associated with a financial account;
    prompting the user to register an identification number for use as a payment facilitator, the identification number comprising a phone number;
    receiving, over the first network, the identification number from the user through one or more input parameters provided to a first graphical user interface element;
    encrypting a first authorization code and transmitting the encrypted authorization code to a mobile device associated with the identification number;
    receiving a second authorization code from the mobile device responsive to the transmitted authorization code;
    associating the identification number with the financial account based on a comparison of the first authorization code and the second authorization code;
    receiving purchase detail information from the user over the first network through one or more input parameters provided to a second graphical user interface element different from the first graphical user interface element, the purchase details information specifying characteristics associated with a transaction to be provided by a merchant processing a payment using the identification number;
    providing registration information to the merchant prior to a time the user initiates a purchase, the registration information comprising the identification number and purchase details information;
    receiving, over a second network, the identification number and the purchase detail information at the time the user initiates a purchase through one or more input parameters provided to a third graphical user interface element different from the first and second graphical user interface elements;
    verifying the identification number and the purchase detail information; and
    scheduling, at the time the user initiates a purchase using the identification number, a payment to the merchant through the bill payment platform based on the verification.

2. The computer-implemented method of claim 1, further comprising:
    providing the user with an opportunity to customize the usage of the identification number as a payment facilitator.

3. The computer-implemented method of claim 2, wherein providing the user with an opportunity to customize the usage of the identification number as a payment facilitator comprises allowing the user to specify one or more merchants authorized to use the identification number as a payment facilitator through one or more inputs provided to a fourth user interface element different from the first, second, and third user interface elements.

4. The computer-implemented method of claim 2, wherein providing the user with an opportunity to customize the usage of the identification number as a payment facilitator comprises allowing the user to limit the use of the identification number as a payment facilitator.

5. The computer-implemented method of claim 4, wherein allowing the user to limit the use of the identification number as a payment facilitator comprises allowing the user to specify particular dates on which, times at which, products for which, or merchants for which the identification number cannot be used as a payment facilitator, through one or more inputs provided to a fourth user interface element different from the first, second, and third user interface elements.

6. The computer-implemented method of claim 1, further comprising:
    transmitting the identification number to a third party for activation.

7. The computer-implemented method of claim 6, wherein transmitting the identification number to a third party comprises transmitting the identification number to a routing partner.

8. The computer-implemented method of claim 7, wherein the routing partner transmits the identification number to one or more merchants accepting identification numbers as a payment facilitator.

9. The computer-implemented method of claim 1, further comprising:
    transmitting the user-specified characteristics information associated with the transaction to one or more merchants accepting the identification number as a payment facilitator.

10. The computer-implemented method of claim 1, wherein prompting the user to register the identification number for use as a payment facilitator comprises directing the user to a routing partner's website.

11. The computer-implemented method of claim 10, wherein the routing partner receives the identification number from the user.

12. The computer-implemented method of claim 11, wherein the routing partner authenticates the identification number and associates the user and the bill payment platform with the identification number.

13. The computer-implemented method of claim 12, wherein, after authentication of the identification number, the routing partner transmits the identification number to the bill payment platform or one or more merchants accepting identification numbers as a payment facilitator.

14. The computer-implemented method of claim 1, wherein the first network and the second network are different networks.

15. The computer-implemented method of claim 1, wherein the purchase level details information define a plurality of levels based on a respective merchant type.

16. A system for registering a phone number as a payment facilitator, the system comprising:
a database; and
a processor coupled to the database and configured to:
prompt a user, over a first network, to register a phone number within a bill payment platform as a payment facilitator;
receive the phone number from the user over the first network through one or more input parameters provided to a first graphical user interface element;
transmit a first authorization code, over a second network, to a mobile device associated with the phone number, wherein the system encrypts the first authorization code before transmitting the first authorization code to the user;
prompt the user to provide the first authorization code;
receive a second authorization code from the user;
associate the phone number with a financial account of the user based on a comparison of the first authorization code and the second authorization code;
provide the user with a list of merchants accepting the phone number as a payment facilitator;
receive purchase detail information from the user through one or more input parameters provided to a second user interface element different from the first user interface element, the purchase details information specifying characteristics associated with a transaction to be provided by a merchant processing a payment using the phone number;
transmit the phone number and purchase detail information to one or more of the merchants accepting phone numbers as payment facilitators;
receive, over a third network, the phone number through one or more input parameters provided to a third graphical user interface element different from the first and second user interface elements, and receive purchase detail information at the time a user initiates a purchase;
verify the phone number and purchase detail information; and
schedule, at the time the user initiates a purchase using the phone number, a payment to the merchant from the financial account based on the verification.

17. The system of claim 16, wherein the phone number is a mobile phone number.

18. The system of claim 16, wherein the processor transmits the authorization code to the user via a text message sent to the phone number.

19. The system of claim 16, wherein the processor transmits the authorization code to the user via a voice message sent to the phone number.

20. The system of claim 16, wherein the processor receives the authorization code from the user via a text message sent from the phone number.

21. The system of claim 16, wherein the processor receives the authorization code from the user via a voice message left from the phone number.

22. The system of claim 16, wherein the processor receives the authorization code from the user via a phone call placed from the phone number.

23. The system of claim 16, wherein the processor is further configured to encrypt the phone number before transmitting the phone number to one or more of the merchants accepting phone numbers as payment facilitators.

24. The system of claim 16, wherein the first network and second network are different, and wherein the third network is not a credit card payment network.

25. The system of claim 16, wherein the purchase level details information define a plurality of levels based on a respective merchant type.

26. A computer-implemented method of processing a payment using a phone number, the method comprising:
prompting, by a processor, a consumer to enter a phone number as a payment facilitator for a transaction with a merchant;
receiving, by the processor, the phone number over a network through one or more input parameters provided to a first user interface element;
receiving, by the processor, purchase detail information from the consumer over the network through one or more input parameters provided to a second user interface element different from the first user interface element, the purchase detail information specifying characteristics associated with a transaction to be provided by a merchant processing a payment using the phone number;
encrypting a first authorization code and transmitting the encrypted authorization code to a mobile device associated with the received phone number;
receiving a second authorization code from the mobile device responsive to the transmitted authorization code;
associating the phone number with a financial account of the user based on a comparison of the first authorization code and the second authorization code;
transmitting, by the processor, registration information over a second network to the merchant prior to the time a user initiates a purchase, the registration information comprising the phone number and the purchase detail information;
verifying, by the processor, the phone number has been registered for use as a payment facilitator;
transmitting, by the processor, the phone number and purchase detail information to a bill payment platform over a third network;
scheduling in real-time, by the bill payment platform, a payment to the merchant from a financial account associated with the phone number;
providing, by the bill payment platform, information regarding the scheduled payment; and
transmitting, by the bill payment platform, the payment to the merchant.

27. The computer-implemented method of claim 26, further comprising:
comparing the purchase detail information to a record of the consumer's preferences; and determining whether the consumer's preferences forbid the purchase.

28. The computer-implemented method of claim 27, further comprising:
denying the use of the phone number as a payment facilitator if the consumer's preferences forbid the purchase.

29. The computer-implemented method of claim 26, further comprising:
transmitting an approval message to a merchant processing the payment after the withdrawal from the financial account has been successfully scheduled.

30. The computer-implemented method of claim 26, wherein providing the consumer with the customized level of detail regarding the purchase is performed via a third user interface element different from the first and second user interface elements, wherein the third user interface element is associated with the bill payment platform.

31. The computer-implemented method of claim 26, further comprising:
verifying that the financial account contains sufficient funds to successfully complete the payment.

32. The computer-implemented method of claim 26, wherein the first network and second network are different, and wherein the third network is not a credit card payment network.

33. The computer-implemented method of claim 26, wherein the purchase level details information define a plurality of levels based on a respective merchant type.

* * * * *